3,033,800
IMPREGNATION OF POROUS SOLIDS
George E. Elliott, Jr., Oakmont, and Bernard J. Lerner, Pittsburgh, Pa., assignors to Gulf Research & Development Company, Pittsburgh, Pa., a corporation of Delaware
No Drawing. Filed Apr. 10, 1959, Ser. No. 805,371
4 Claims. (Cl. 252—455)

This invention pertains to procedure for preparing a uniform deposit of a metalliferous substance on a porous carrier.

It has been known to deposit metalliferous substances on porous carriers. For instance it is known to prepare a metalliferous catalyst by dissolving a water soluble metal salt in water and impregnating the porous carrier with the salt. Thereafter the carrier is dried and in many cases calcined. During the drying operation the aqueous solution of the metal salt tends to migrate out of the fine pores of the porous solid so that the metal salt is not uniformly deposited throughout the pores and interstices of the porous solid. This migration is caused by capillary type suction forces generated during drying which forces are surprisingly great. Therefore the salt is preferentially deposited on the surface of the porous solid or in the pores of the porous solid adjacent to the surface. This lack of uniform deposition is undesirable. For instance, in connection with a catalyst, it reduces the effectiveness of the catalyst and results in spalling due to localized strains set up in the catalyst during the catalytic reaction or subsequent regeneration.

This invention has for its object to provide improved procedure for impregnating porous solids. Another object is to provide improved procedure for obtaining uniform deposition of metalliferous substances on or in the pores of porous solids. A still further object is to provide improved procedure for preparing a catalyst by impregnation of a porous solid with metalliferous substances. Other objects will appear hereinafter.

These and other objects of our invention are accomplished by contacting the porous solid with an aqueous solution which contains a substance to be uniformly deposited on or in the pores of the porous solid, said aqueous solution also containing a dissolved organic gellable substance. After impregnation of the pores of the porous solid with this aqueous solution the porous solid is treated to cause gellation of the organic gellable substance. Thereafter the organic solid containing the gelled organic substance is subjected to drying to remove water, the organic gellable substance being maintained in gelled condition during said drying operation. We have found that the gel structure can be dried without migrating and therefore uniform deposition is obtained.

In most cases it is desirable to employ a gellable substance which will not leave a residue after calcination. Inorganic gellable substances such as aluminum hydroxide, silica hydrous gel, etc. are usually undesirable unless the carrier already contains these substances and additional amounts of them in the final product will not have an adverse effect. With these exceptions, any organic gellable substance may be used which will form a gel with water. The gel forming substance may be one which is soluble in water at one temperature but forms a gel at a higher or lower temperature, or it may be one which is insoluble in water but when in colloidal dispersion in water will form a gel on suitable treatment. Examples of satisfactory organic gelling agents are water soluble cellulose ethers, gelatin, agar, pectin, gum arabic, albumin such as egg albumin, gum tragacanth, starch and "Carbopol" (a mucilage or gel forming substance manufactured by B. F. Goodrich Chemical Company).

The amounts of the gel forming substance which should be used cannot be specified, except in general terms, since the amount depends upon the particular gel forming substance used, the concentration used, the temperature at which the gel is formed and the type or kind of metalliferous compound which is to be deposited upon the porous carrier. In general it can be stated that the gelling agent is used in such amounts that the viscosity of the aqueous impregnating solution at 20° C. is below about 2000 centipoises. The lower the viscosity of the impregnating solution, the faster will be the impregnation. This viscosity will generally result when between about 1 and 10 percent of the gelling agent is used.

The amount of the gelling agent most advantageously used can be readily determined by a series of tests. For instance a series of concentrations of the gelling agent in the impregnating solution to be used can be prepared. The concentration increments between each of the tests in the series can be as large or as small as desired. This test series is then heated to a gelling temperature (when a gelling agent is used which gels on heating) or is cooled to a gelling temperature (when a gelling agent is used which gels on cooling). The test series is then tested with a knife and the concentrations which have gelled as shown by a knife cut, the edges of which cut do not flow back together, are the concentrations which may be employed for impregnating the porous solid. During the following impregnation the temperature is less than the temperature of the test series (when a heat forming gel is employed) and is greater than the temperature of the test series (when the gel forming agent forms a gel on cooling). For best results it is also desirable that the impregnating solution meet another test. As indicated above it must have a sufficiently low viscosity that it will flow into the interstices or pores of the porous solid within a reasonable time. While the above general rule (i.e. the use of viscosities below 2000 centipoises) may be used in most cases, it is advantageous to carry out a series of tests to select a solution having characteristics which readily flow into the pores. This test can be carried out in a simple manner by impregnating the porous solid with the impregnating solution free of the gel forming agent. The solid is simply immersed in the impregnating solution and left for 30 minutes. The solid is then filtered on a Buchner funnel and weighed. The amount of liquid absorbed is determined by subtracting the weight of the solid free of liquid from the impregnated weight. The same solution containing the amount of gel in question is then contacted with the same solid and left for 30 minutes. It is filtered on a Buchner funnel and weighed and the increase in weight is determined. The increase in weight of the solid impregnated with the liquid containing the gel should be at least 60 percent of the increase in weight obtained when the impregnating liquid was free of the gel forming agent. If a 60 percent value is not obtained, less gel forming agent should be used.

Our invention is of particular advantage in connection with agents which form gels during heating. In this way not only is the gel formed by the heating step, but subsequent dehydration is improved since it also takes place during subsequent heating to dehydration temperature. Another advantage is the relatively low viscosity of the aqueous solutions when many of these heat gelling agents are used. Examples of such heat gelling agents are the low molecular weight cellulose ethers such as methoxy and ethoxy cellulose. A very satisfactory cellulose ether is marketed by Dow Chemical Company under the trade name "Methocel." It is a dimethoxy ether of cellulose, the methoxy content varying from 27.5 to 32.0 percent.

Our invention is of general applicability to the deposition of metalliferous materials on or in the pores of porous solids. For instance it is known that hydrogenation, hydrodesulfurization, oxidation, dehydrogenation, hydroreforming, hydroisomerization, alkylation, dealkylation, hydration, etc. processes use catalysts that are prepared by depositing metalliferous materials upon porous carriers. Our invention is applicable to all such applications. Specifically it is known to use catalysts such as nickel, platinum, chromium, molybdenum, tungsten, cobalt, iron, etc. metals, oxides or sulfides thereof or combinations thereof such as cobalt molybdate, nickel tungstate, etc. as catalysts deposited upon porous carriers such as alumina, silica, silica-alumina, pumice, etc. in powder, pellet, spherical, etc. form. These catalysts are used in one or more of the above mentioned types of reactions. Our invention is applicable to the preparation of all such catalysts. All of these catalysts are commonly prepared by impregnating a porous carrier with an aqueous solution and such procedure is obviously amenable to the principles of our invention. The metal compound and gel former in question should be compatible, i.e. the metal compound should not prevent gel formation and if it does, another gel former should be used. Another reason for using the test series outlined above is that the metal salt solution will in many cases raise or lower the temperature at which gel formation takes place.

The contact between the porous solid and the aqueous solution may be brought about in any desired manner. Many such methods are well known in the prior art. For instance it is satisfactory to simply immerse the porous solid in the aqueous solution and then decant or filter off the excess liquid. On the other hand the liquid and solid may be tumbled together using only enough liquid to saturate the solid. Alternatively the mixture of liquid, impregnating solution and solid substance may be subjected to a vacuum in order to improve the impregnation. Another method is to utilize just sufficient liquid to cover the catalyst particles and subject this covered mass of the solid particles to vibration in the presence of the liquid. This results in puddling. This procedure avoids the necessity for removing excess liquid. Regardless of the method used to contact the liquid and solid, if excess liquid remains, it is generally desirable to remove it by draining, decanting, filtering, etc.

It is known that when a liquid is contacted with an adsorbent, heat of adsorption is generated. In general the larger the surface area of the porous solid, the greater the heat of adsorption. It is desirable to keep this property in mind during the impregnation since it might give rise to the formation of a gel before complete impregnation has taken place. For instance if a gel forming agent is used which forms a gel upon heating, it is evident that if the heat of adsorption causes a rise in temperature in excess of the temperature of the gel formation, premature formation of the gel will take place and complete impregnation will not be obtained. The heat of adsorption can be taken advantage of by utilizing the heat thus released to bring the entire porous solid-gel forming solution up to the neighborhood of the gelling temperature. Also the heat of adsorption will reduce the viscosity of the impregnating solution in many cases. This is especially true of gel forming agents which gel upon cooling. Therefore in such a case it is possible to use a higher concentration of gel forming agent or a more viscous impregnating solution since the heat of adsorption will reduce the viscosity of the impregnating solution during the impregnation.

After impregnation, the solid particles are subjected to a treatment to cause the gellable substance to form a gel. Formation of the gel must take place prior to any substantial dehydration. Therefore formation of the gel is accomplished by subjecting the gellable substance to a gel forming treatment which will not cause substantial dehydration prior to gel formation. The treatment will depend upon the type of gel employed. Many gels can be formed easily by simply cooling the aqueous solution containing the gellable substance. Such gels have the added advantage that practically no dehydration will take place during such cooling and therefore substantially no migration will take place prior to formation of the gel. Another type of gel derived from cellulose ethers as mentioned above is formed when an aqueous solution of the gel forming substance is heated. With these materials it is desirable to use a gel-forming substance which will gel at a sufficiently low temperature that inconsequential dehydration will take place prior to gel formation. For this reason gel forming substances which form gels at a temperature below about 200° F. are advantageously used when atmospheric pressures are employed. It is of course to be understood that conditions can be altered to prevent such dehydration at temperatures above the boiling point of water. For instance, a gel forming substance forming a gel at a temperature above 212° F. can be used if the gelling operation is carried out under superatmospheric pressure to avoid substantial vaporization of the water. Alternatively the air surrounding the catalyst can be kept saturated with water vapor so that no drying will take place.

After the formation of the gel has taken place, the porous solid and gelled impregnating solution are subjected to drying conditions. Thus one type of drying operation is to heat to a temperature the same as or above the boiling point of water under the conditions employed. Reduced pressure may be used with advantage. Drying can also be accomplished by using the temperatures which do not even remotely approach the boiling point of water. For example, air may be dried by bypassing through a dehydrating agent such as activated alumina and then passed through the drying chamber in which the catalyst is located. Also the air can be heated so that its wet bulb temperature is increased and then used to dry the solid. It is desirable during the drying operation to avoid temperatures so high that the gel is carbonized. The objective is to dry at a rate such that the operation can be carried out within an economical time and yet not to employ excessive temperatures which will result in decomposition or liquefaction of the gel with resultant migration or dislocation in the pores.

After the drying is complete or substantially complete (as indicated by a test calcining which does not result in movement of the gel to the surface of the solid—or by substantially no further water being removed) the catalyst or porous solid is given a calcining treatment at a temperature above the temperature of decomposition of the gellable substance. This converts the gellable substance into carbon dioxide and water and thus removes it from the pores of the porous solid. A calcining temperature of between about 500° and 1500° F. is in general satisfactory. In many cases it is not only necessary to remove the gellable substance but also convert the metalliferrous compound into an oxide by calcination. For instance when impregnating a porous carrier with nickel nitrate in order to obtain a nickel oxide catalyst, the impregnated and dried porous carrier would be calcined at a temperature of about 500° to 1500° F. to decompose and remove the gellable substance and to convert the nickel nitrate to nickel oxide. A calcining temperature should not be selected which results in deactivation of the catalyst. Temperatures in the range mentioned are satisfactory for most catalysts.

EXAMPLE I

*Preparation of a Nickel-Tungsten Catalyst on a Silica Alumina Cracking Catalyst Carrier*

A nickel nitrate solution containing an equivalent of 20 percent NiO was prepared by dissolving one part by weight of nickel nitrate hexahydrate, $Ni(NO_3)_2 \cdot 6H_2O$, in 28.3 parts of water. An ammonium meta tungstate solution was prepared as follows: 100 parts of "Baker's C.P." finely divided tungstic acid, $WO_3 \cdot H_2O$, was slurried with 167 parts of distilled water at room temperature. To this slurry was added dropwise and with mechanical stirring 11.8 parts of bottle ammonia (28% $NH_3$) diluted with 43 parts of distilled water. This mixture was allowed to stand for about two hours and then heated to near boiling temperature on a steam bath and allowed to cool and stand over night. The slurry was filtered, and the solution was found to contain about 24.5 percent $WO_3$ having a pH of about 5. The $WO_3$ content of this solution was increased to 41.6 percent by evaporation. The solution contained about 73.8 percent of the tungsten charged to the initial slurry. The remaining undissolved material might be reworked for further tungsten recovery. The nickel nitrate and ammonium meta tungstate solutions were mixed by combining 51.3 parts by weight of the nickel solution with 76.7 parts of the tungsten solution. This resulted in a solution containing the equivalent of 32 percent NiO and $WO_3$ in a mol ratio of 1:1, the specific gravity of the solution being 1.54. An impregnating solution was prepared by taking one-half of the total nickel-tungsten solution prepared as above, heating to 176° F. and mixing it with 3.8 parts by weight of dry methyl cellulose. ("Methocel" manufactured by Dow Chemical Company, grade 15 cp.) The remainder of the cold nickel-tungsten solution and an additional 34.5 parts of cold distilled water were then added. The final impregnating solution contained 2.3 percent methyl cellulose and the equivalent of 19.1 percent $WO_3$ and 6.2 percent NiO, the specific gravity of the solution being 1.42. The nickel tungsten-methyl cellulose solution thus prepared was added to 38.03 parts by weight of calcined microspheroidal synthetic silica-alumina cracking catalyst (MS–A, American Cyanamide catalyst). The mixture was then evacuated to 6–10 mm. Hg and the mixture was allowed to remain under vacuum for 5 minutes and then at atmospheric pressure for 10 minutes after which the excess liquid was removed from the impregnated mass. The mass was then heated to 185° F. for 30 minutes to form a nickel-tungsten-cellulose methyl ether gel in the interstices of the porous carrier. The catalyst composite was then dried at 250° F. for 24 hours and calcined by heating in air to 1000° F. for 6 hours and was then held at this temperature for approximately 10 additional hours. This catalyst contained, on a weight basis, about 18.5 percent $WO_3$ and 6.0 percent NiO.

EXAMPLE II

*Preparation of a Platinum Catalyst Composited With an Alumina Carrier*

A 7 percent solution of $PtCl_4$ is mixed with Knox gelatin in the ratio of 75 parts of gelatin per 100 parts of aqueous solution. The solution is heated to 200° F. and is then introduced into a vessel containing alumina spheres prepared according to U.S. Patent 2,689,226. Excess interstitial liquid is then drained from the spheres. The temperature is then lowered rapidly to 100° F. by cooling with water to form a gel in the alumina pores. A vacuum of 10 mm. Hg is pumped on the vessel and held at that pressure for 24 hours. The entire mass is then heated for an additional 24 hours at 200° F. and then calcined at 1000° F. for 5 hours.

We claim:

1. The process for depositing a compound of a catalytic metal upon a porous solid which comprises preparing an aqueous solution which contains the compound of a catalytic metal and a dissolved organic gellable substance, contacting the porous solid with the aqueous solution while the gellable substance remains in ungelled condition, converting the gellable substance into a gel in the pores of the porous solid, drying the porous solid while maintaining the organic substance in gelled condition and calcining to remove the dried gel from the porous solid by combustion.

2. The process for impregnating a porous solid with a metal salt which comprises preparing an aqueous solution which contains the metal salt and a dissolved organic gellable substance, contacting the porous solid with the aqueous solution while the gellable substance remains in ungelled condition, converting the gellable substance into a gel in the pores of the porous solid, drying the porous solid while maintaining the organic substance in gelled condition and calcining to remove the dried gel from the porous solid by combustion.

3. The process for depositing a compound of a catalytic metal upon a porous solid which comprises preparing an aqueous solution which contains the compound of a catalytic metal and a substance which forms a gel upon cooling, contacting the porous solid with the aqueous solution at a temperature at which the gel forming substance remains in ungelled form, converting the gel forming substance into a gel in the pores of the porous solid by cooling, drying the cooled porous solid while the gellable substance remains in gelled condition and calcining to remove the dried gel from the porous solid by combustion.

4. The process for depositing a compound of a catalytic metal upon a porous solid which comprises preparing an aqueous solution which contains the compound of a catalytic metal and cellulose methyl ether in solution, contacting the porous solid with the aqueous solution while the cellulose methyl ether remains in ungelled or dissolved condition, converting the cellulose methyl ether into a gel in the pores of the porous solid by heating, drying the heated porous solid while the cellulose methyl ether remains in gelled condition and calcining to remove the dried cellulose methyl ether from the porous solid by combustion.

References Cited in the file of this patent

UNITED STATES PATENTS 2,695,893    Houdry _____ Nov. 30, 1954